United States Patent
Hirata et al.

(10) Patent No.: US 10,061,153 B2
(45) Date of Patent: Aug. 28, 2018

(54) CURVED DISPLAY AND AUTOMOTIVE DEVICE

(71) Applicant: Panasonic Liquid Crystal Display Co., Ltd., Himeji-shi, Hyogo (JP)

(72) Inventors: Masafumi Hirata, Hyogo (JP); Hiroaki Goto, Osaka (JP); Takeshi Aramaki, Kanagawa (JP); Masashi Kuno, Hyogo (JP)

(73) Assignee: Panasonic Liquid Crystal Display Co., Ltd., Hyogo (JP)

( * ) Notice: Subject to any disclaimer, the term of this patent is extended or adjusted under 35 U.S.C. 154(b) by 17 days.

(21) Appl. No.: 15/450,921

(22) Filed: Mar. 6, 2017

(65) Prior Publication Data
US 2017/0285392 A1  Oct. 5, 2017

(30) Foreign Application Priority Data
Mar. 30, 2016  (JP) .................................. 2016-069545

(51) Int. Cl.
*G02F 1/1335* (2006.01)
*G02F 1/1362* (2006.01)
*G02F 1/1333* (2006.01)

(52) U.S. Cl.
CPC .. *G02F 1/133512* (2013.01); *G02F 1/133308* (2013.01); *G02F 1/136209* (2013.01); *G02F 1/136286* (2013.01); *G02F 2201/56* (2013.01)

(58) Field of Classification Search
CPC ......... G02F 1/133512; G02F 1/136209; G02F 1/136286; G02F 1/133308
See application file for complete search history.

(56) References Cited

U.S. PATENT DOCUMENTS

| | | | |
|---|---|---|---|
| 2010/0001939 A1* | 1/2010 | Ochiai | G02F 1/133512 345/88 |
| 2016/0097950 A1* | 4/2016 | Chang | G02F 1/133512 349/43 |

FOREIGN PATENT DOCUMENTS

JP   2009-092884   4/2009

* cited by examiner

*Primary Examiner* — Fei Fei Yeung Lopez
(74) *Attorney, Agent, or Firm* — Hamre, Schumann, Mueller & Larson, P.C.

(57) ABSTRACT

A curved display comprises a first substrate 100 and a second substrate 200 that are disposed opposite to each other and both curved along the first direction. The first substrate includes data lines 11 and gate lines 12. The second substrate includes light transmission parts 202 and a light shielding part 203. The light shielding part includes first light shielding portions 203b extending in the first direction and second light shielding portions 203a extending in a second direction. The second light shielding portions include a central light shielding portion a5, a first end light shielding portion a1 disposed on one end side in the first direction, and a middle light shielding portion disposed therebetween. A width in the first direction of the middle light shielding portion is greater than or equal to that of the central light shielding portion and the first end light shielding portion.

17 Claims, 21 Drawing Sheets

FIG.4
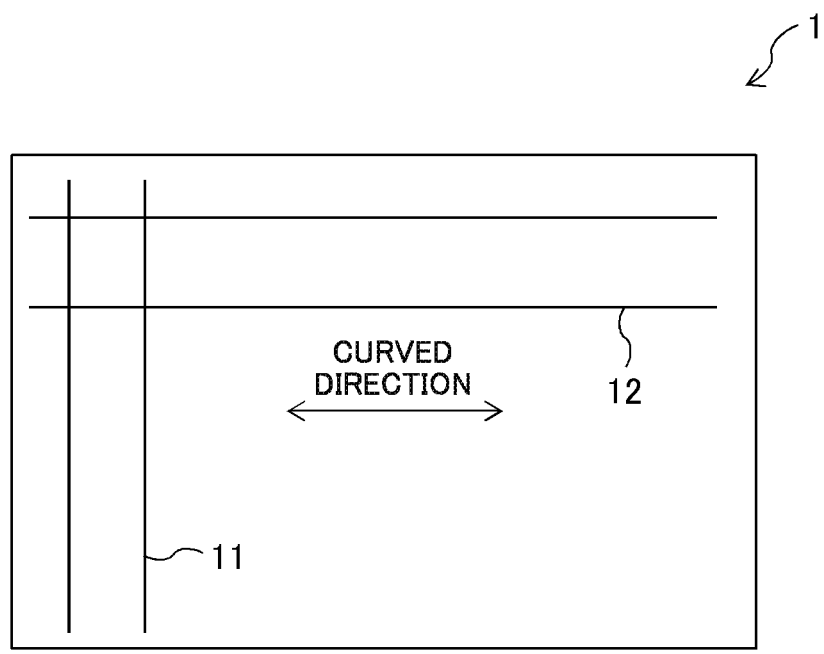
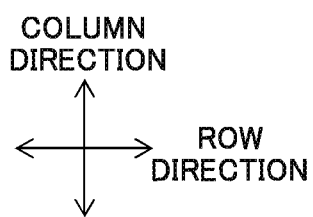

FIG.5
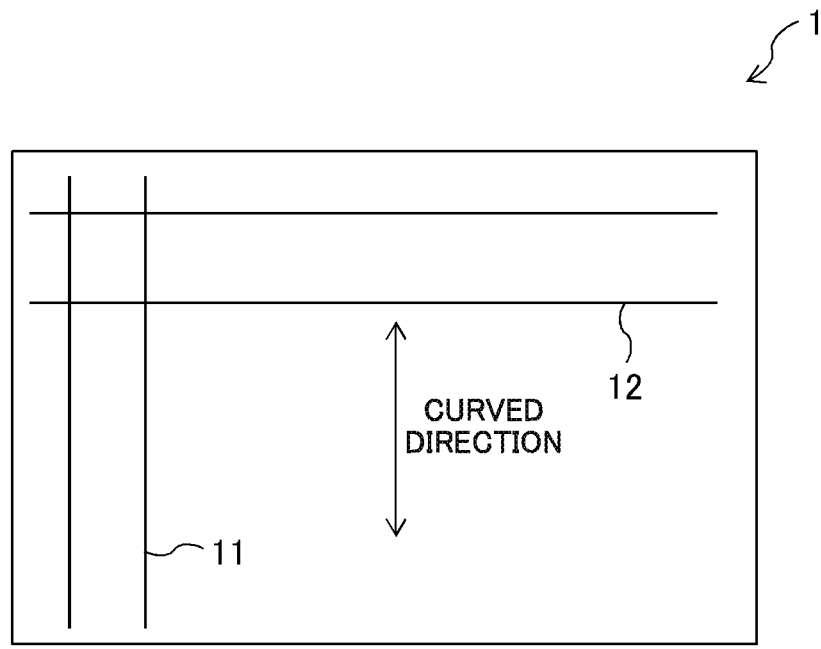
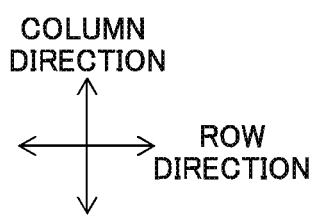

FIG.6
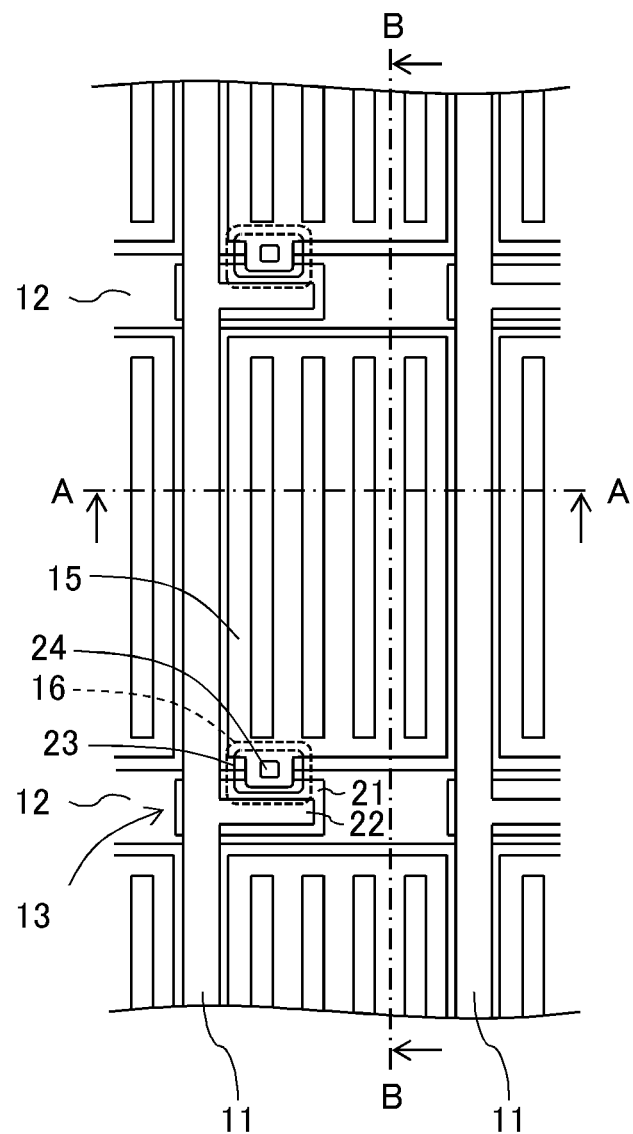
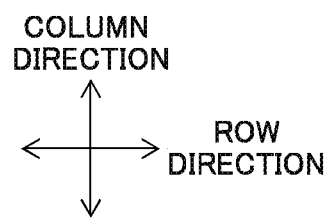

FIG.8
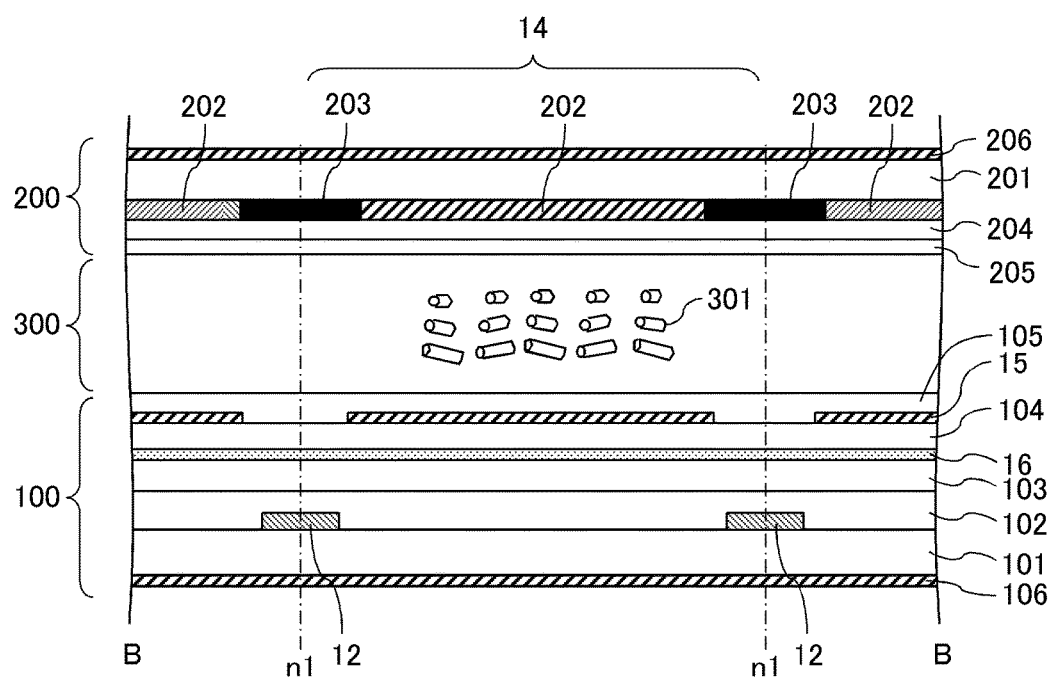
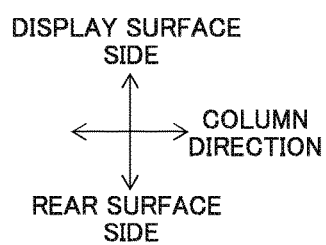

10,061,153 B2

CURVED DISPLAY AND AUTOMOTIVE DEVICE

CROSS-REFERENCE TO RELATED APPLICATION

This application claims priority from Japanese application JP 2016-069545, filed Mar. 30, 2016. This Japanese application is incorporated herein by reference.

TECHNICAL FIELD

The present invention relates to a curved display and an automotive device including the curved display.

BACKGROUND

A liquid crystal curved display having a display surface is shown in for example JP2009-92884. In the curved display, each of a pair of substrates (a thin film transistor substrate (TFT substrate) and a color filter substrate (CF substrate)) is curved.

SUMMARY

The inventors of the present disclosure have found that a display defect occurs due to displacement between a TFT substrate and a CF substrate in a liquid crystal curved display having a curved display surface. Specifically, when the TFT substrate and the CF substrate are bonded to each other and bent in a process of manufacturing the liquid crystal curved display, tensile and compressive stresses are applied to the TFT and CF substrates, and magnitude of the displacement (displacement amount) between the TFT substrate and the CF substrate varies according to a stress distribution in a display area, whereby color mixture or light leakage occurs to visually recognize display unevenness. FIG. 15 is a view illustrating a simulation result of the displacement amount that occurs when the display panel in which the TFT substrate and the CF substrate are bonded to each other is bent with a curvature radius of 500 mm. At this point, the displacement amount is illustrated when the laterally long display panel is bent in a lengthwise direction (crosswise direction) while right and left ends of the display panel are fixed. As illustrated in FIG. 15, the displacement amount is small in a central portion and the right and left ends of the display panel, and the displacement amount is large in an area between the central portion and each of the right and left ends of the display panel. The simulation result shows that the display unevenness becomes conspicuous in the area having the large displacement amount.

The present disclosure has been made in view of the above circumstances, and an object thereof is to provide an automotive device including a curved display that can suppress display quality degradation caused by the displacement between the TFT and CF substrates.

To solve the above problem, a curved display according to the present disclosure comprises: a first substrate in which a portion located at a center in a first direction is convexly or concavely curved toward a display surface side with respect to portions located at both ends in the first direction; and a second substrate that is disposed opposite to the first substrate and curved along the first substrate, wherein the first substrate includes a plurality of data lines and a plurality of gate lines, the second substrate includes a plurality of light transmission parts that transmits light and a light shielding part that is formed around each of the plurality of light transmission parts to block the light transmission, the light shielding part includes a plurality of first light shielding portions extending in the first direction and a plurality of second light shielding portions extending in a second direction different from the first direction, the plurality of second light shielding portions include a central light shielding portion disposed on a central side of a display surface, a first end light shielding portion disposed on one end side in the first direction of the display surface, and a middle light shielding portion disposed between the central light shielding portion and the first end light shielding portion, and a width in the first direction of the middle light shielding portion is wider than a width in the first direction of the central light shielding portion, and is greater than or equal to a width in the first direction of the first end light shielding portion.

To solve the above problem, an automotive device according to the present disclosure comprises: the curved display described in above; and a main body component including a frame body disposed in a periphery of the curved display, the main body component being used to attach the curved display to a vehicle, wherein the frame body of the main body component includes a first frame edge portion extending in the first direction in the periphery of the curved display, and the first frame edge portion includes a first bent area that is curved in the first direction so as to project toward a direction identical to the first substrate of the curved display.

BRIEF DESCRIPTION OF THE DRAWINGS

FIG. 4 is a plan view illustrating a curved direction of the curved display according to an exemplary embodiment;

FIG. 5 is a plan view illustrating a curved direction of the curved display according to an exemplary embodiment;

FIG. 6 is a plan view illustrating a configuration of pixels in the curved display according to an exemplary embodiment;

FIG. 8 is a cross-sectional view taken along a line B-B in FIG. 6;

DETAILED DESCRIPTION

Hereinafter, an exemplary embodiment of the present disclosure will be described with reference to the drawings. In the exemplary embodiment, a liquid crystal display device is described as an example of display device. However the present disclosure is not limited to the liquid crystal display device. For example the present disclosure may be an organic electroluminescence display (OLED) device.

Figure 1:
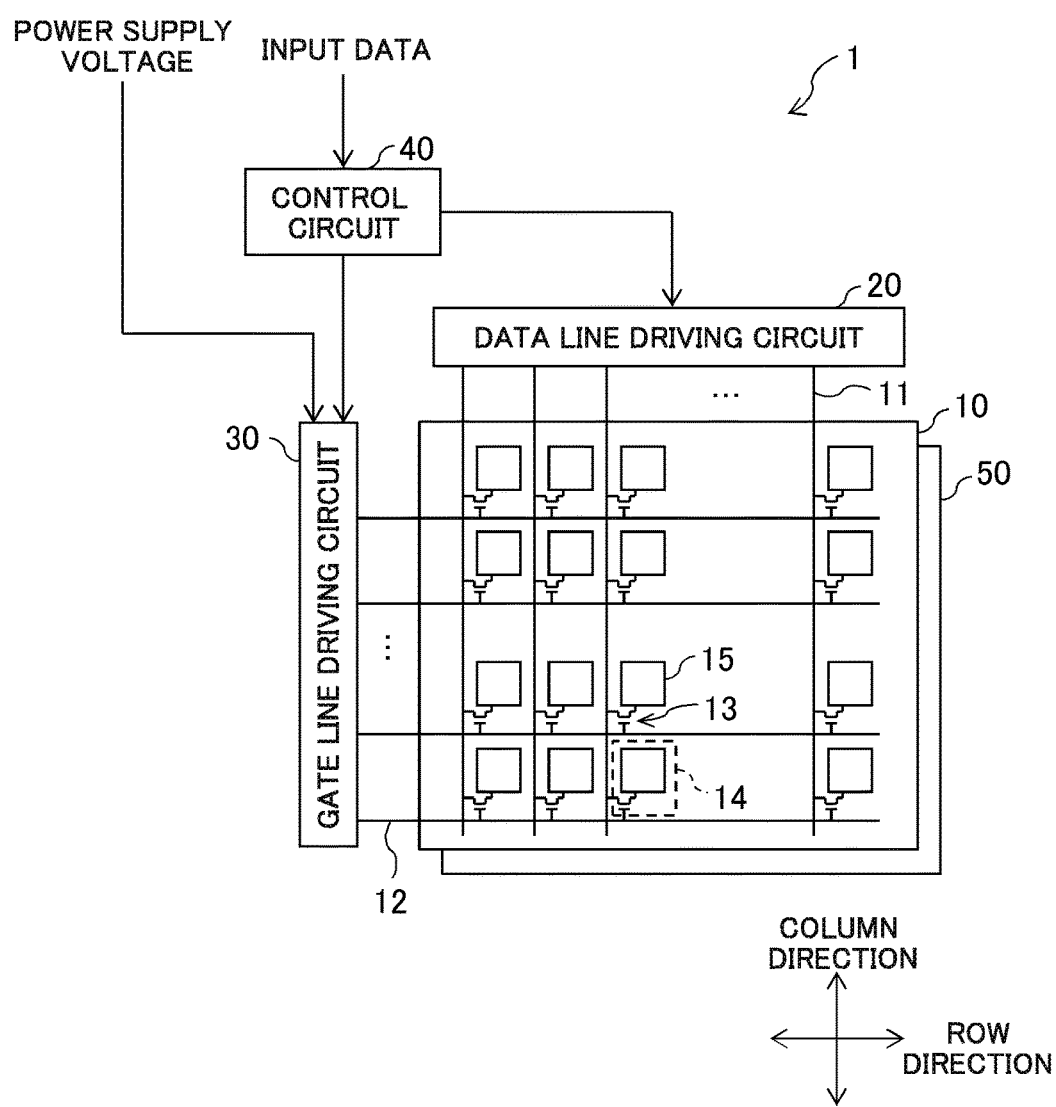
FIG. 1 is a view illustrating a schematic configuration of a curved display according to an exemplary embodiment.

FIG. 1 is a view illustrating a schematic configuration of a curved display according to an exemplary embodiment. Curved display 1 includes display panel 10 that displays an image, a driving circuit (such as data line driving circuit 20 and gate line driving circuit 30) that drives display panel 10, control circuit 40 that controls the driving circuit, and backlight device 50 that irradiates display panel 10 with light from a rear surface side. The driving circuit may be provided in display panel 10.

Figure 2:
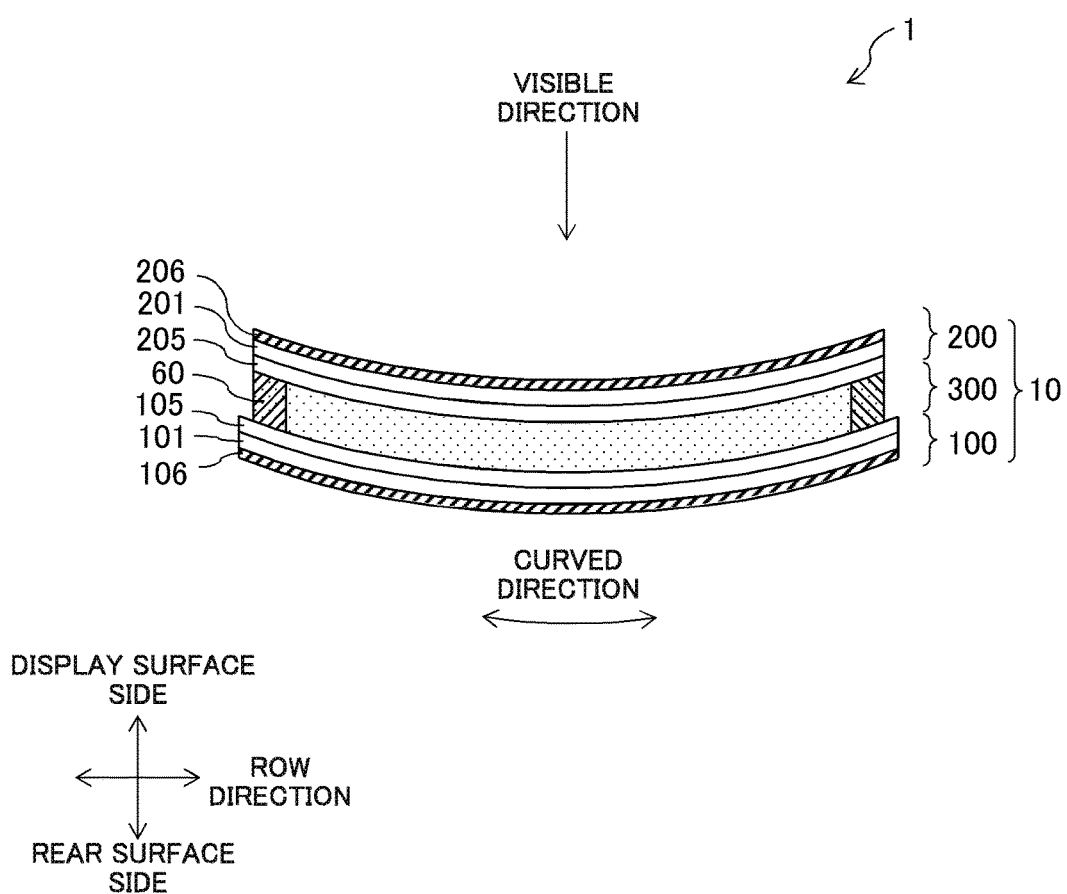
FIG. 2 is a cross-sectional view illustrating that the curved display according to an exemplary embodiment is being curved.
Figure 3:
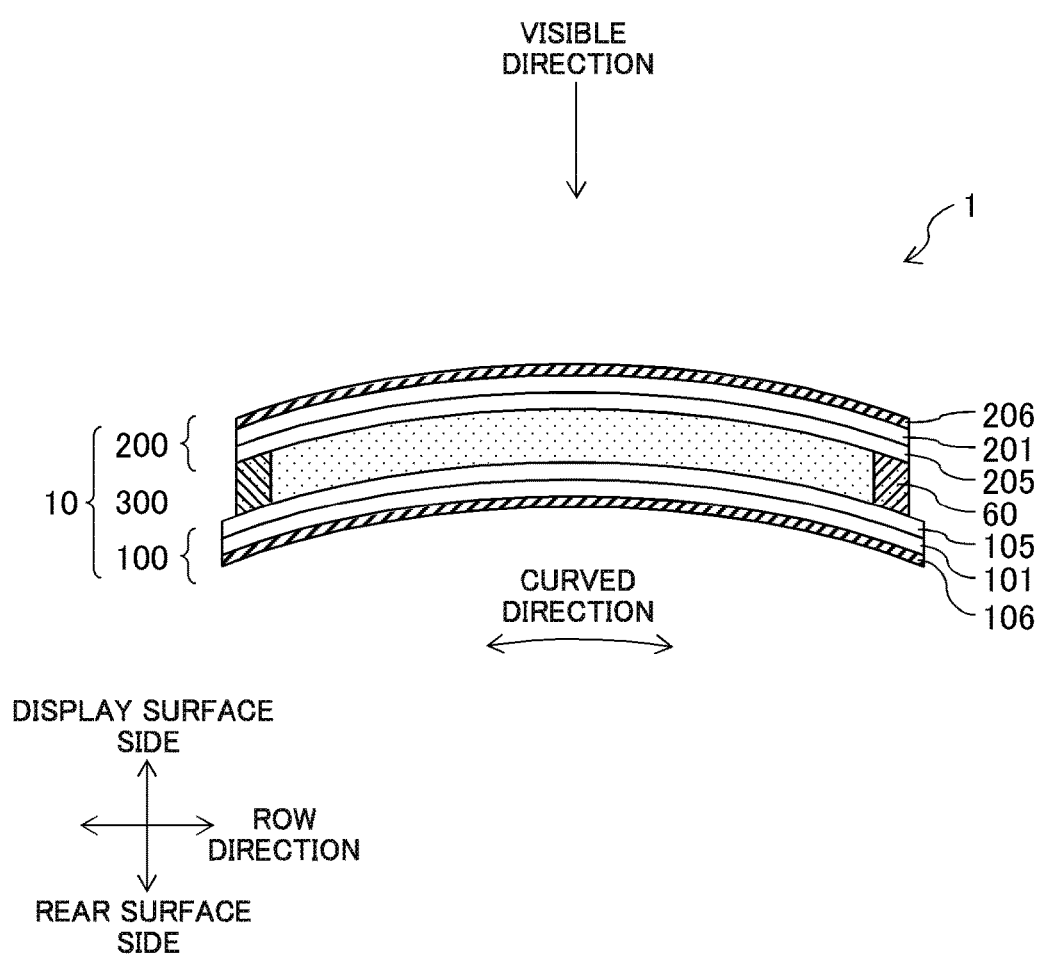
FIG. 3 is a cross-sectional view illustrating that the curved display according to an exemplary embodiment is being curved.

Curved display 1 has a curved external form in which a display surface side is formed into a concave shape while a rear surface side is formed into a convex shape as illustrated in FIG. 2, or has a curved external form in which the display surface side is formed into the convex shape while the rear surface side is formed into the concave shape as illustrated in FIG. 3. In curved display 1 of FIG. 2, a tensile stress is applied to glass substrate 101 constituting a thin film transistor substrate (TFT substrate 100), and a compressive stress is applied to glass substrate 201 constituting a color filter substrate (CF substrate 200). In curved display 1 of FIG. 3, the compressive stress is applied to glass substrate 101 constituting TFT substrate 100, and the tensile stress is applied to glass substrate 201 constituting CF substrate 200. Although described in detail later, liquid crystal layer 300 is disposed between TFT substrate 100 and CF substrate 200, and TFT substrate 100 and CF substrate 200 are fixedly bonded to each other using sealing material 60 with liquid crystal layer 300 sandwiched therebetween.

Referring to FIG. 1, a plurality of data lines 11 extending in a column direction and a plurality of gate lines 12 extending in a row direction are provided in display panel 10. Thin film transistor (TFT) 13 is provided in an intersection portion of each data line 11 and each gate line 12. Each data line 11 and each gate line 12 are formed into a curved shape (convex shape) according to a bending direction of curved display 1. As used herein, the bending direction means a direction parallel to the display surface, and for example the row direction or the column direction. For example, in the case where the bending direction is the row direction (see FIG. 4), data line 11 is formed into a linear shape while gate line 12 is formed into the curved shape. In the case where the bending direction is the column direction (see FIG. 5 described below), data line 11 is formed into the curved shape while gate line 12 is formed into the linear shape.

In display panel 10, a plurality of pixels 14 are arranged into a matrix shape (in the row and column directions) according to intersection portions of data lines 11 and gate lines 12. A plurality of pixel electrodes 15 each of which is provided according to each pixel 14 and one common electrode 16 shared by a plurality of pixels 14 are provided in TFT substrate 100 constituting display panel 10. Common electrode 16 may be disposed in each one or a plurality of pixels 14.

Specifically, based on input data (such as a synchronous signal and a video signal) input from an outside, control circuit 40 outputs various control signals controlling timing of driving data line driving circuit 20 and gate line driving circuit 30, and image data corresponding to an image displayed in a display area of display panel 10.

Data line driving circuit 20 outputs a data signal (data voltage) to each data line 11 based on the control signal and the image data, which are input from control circuit 40.

Based on an externally-input power supply voltage and the control signal input from control circuit 40, gate line driving circuit 30 generates a gate signal (gate voltage), and outputs the gate signal to each gate line 12.

Figure 7:
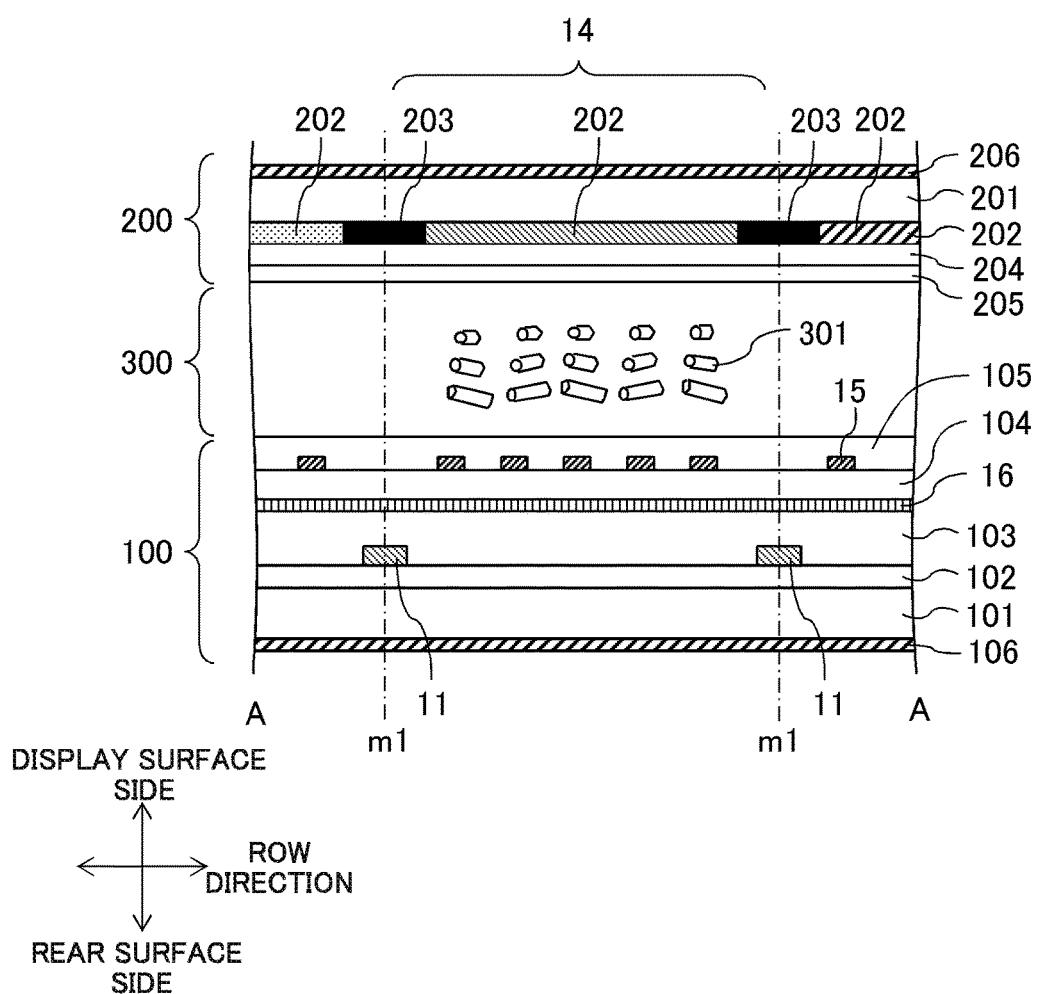
FIG. 7 is a cross-sectional view taken along a line A-A in FIG. 6.

FIG. 6 is a plan view illustrating a configuration example of pixel 14 of display panel 10. FIG. 7 is a sectional view taken along line A-A in FIG. 6, and FIG. 8 is a sectional view taken along line B-B in FIG. 6. A specific configuration of pixel 14 will be described below with reference to FIGS. 6 to 8.

Referring to FIG. 6, an area partitioned by two adjacent data lines 11 and two adjacent gate lines 12 corresponds to one pixel 14. Thin film transistor 13 is provided in a plurality of pixels 14 respectively. Thin film transistor 13 includes semiconductor layer 21 formed on insulator 102 (see FIGS. 7 and 8) and drain electrode 22 and source electrode 23, which are formed on semiconductor layer 21 (see FIG. 6). Drain electrode 22 is electrically connected to data line 11, and source electrode 23 is electrically connected to pixel electrode 15 via through-hole 24.

Pixel electrode 15 including a transparent conductive film such as Indium Tin Oxide (ITO) is formed in each pixel 14. Pixel electrode 15 includes a plurality of openings (slit), and is formed into a stripe shape. There is no limitation to a shape of an opening. one common electrode 16 made of a transparent conductive film such as ITO is formed over the whole display area. One common electrode 16 is shared by a plurality of pixels 14. An opening (corresponding to a dotted-line box in FIG. 6) is formed to electrically connect pixel electrode 15 and source electrode 23 to each other in an area where common electrode 16 overlaps through-hole 24 and source electrode 23 of thin film transistor 13.

As illustrated in FIG. 7, display panel 10 includes TFT substrate 100, CF substrate 200, and liquid crystal layer 300 sandwiched between TFT substrate 100 and CF substrate 200.

In TFT substrate 100, gate line 12 (see FIG. 8) is formed on glass substrate 101, and insulator 102 is formed so as to cover gate line 12. Data line 11 (see FIG. 7) is formed on insulator 102, and insulator 103 is formed so as to cover data line 11. Common electrode 16 is formed on insulator 103, and insulator 104 is formed so as to cover common electrode 16. Pixel electrode 15 is formed on insulator 104, and alignment film 105 is formed so as to cover pixel electrode 15. In glass substrate 101, polarizing plate 106 is bonded to a surface (rear surface) of a glass substrate, the surface facing a backlight device 50 (a side opposite to a liquid crystal layer 300 side).

A plurality of light transmission parts 202 and black matrix 203 are formed in CF substrate 200. A plurality of light transmission parts 202 are disposed according to a plurality of pixels 14, and transmits predetermined light. Black matrix 203 blocks the light transmission. For example, the plurality of light transmission parts 202 include a red light transmission part, a green light transmission part, and a blue light transmission part. In the red light transmission part, a red colored component (red portion) is formed to transmit red light. In the green light transmission part, a green colored component (green portion) is formed to transmit green light. In the blue light transmission part, a blue colored component (blue portion) is formed to transmit blue light. As to an array of the light transmission parts (colored components), a longitudinal stripe array may be adopted such that the red light transmission part, the green light transmission part, and the blue light transmission part are repeatedly arrayed in this order in the row direction while the light transmission parts having the identical color are arrayed in the column direction. Alternatively, a crosswise stripe array may be adopted such that the red light transmission part, the green light transmission part, and the blue light transmission part are repeatedly arrayed in this order in the column direction while the light transmission parts having the identical color are arrayed in the row direction. Black matrix 203 is formed in an area (boundary) between light transmission parts 202 adjacent to each other in the row direction and the column direction. In a portion extending in the column direction of black matrix 203, a position of center line m1 in a width direction coincides with a position of a center line in a width direction of data line 11. In a portion extending in the row direction of black matrix 203, a position of center line n1 in a width direction coincides with a position of a center line in a width direction of gate line 12. A specific configuration of black matrix 203 will be described later.

Overcoat layer 204 is formed so as to cover light transmission part 202 and black matrix 203. Alignment film 205 is formed on overcoat layer 204. In glass substrate 201, polarizing plate 206 is bonded to a face (surface) on a display surface side (the side opposite to the liquid crystal layer 300 side). The laminated structure of each part constituting pixel 14 is not limited to the structure in FIGS. 7 and 8, but a known structure can be applied.

Liquid crystal 301 is sealed in liquid crystal layer 300. Liquid crystal 301 may be a negative liquid crystal having a negative dielectric anisotropy or a positive liquid crystal having a positive dielectric anisotropy. Alignment film 105, 205 may be an alignment film subjected to a rubbing alignment process or a light alignment film subjected to a light alignment process.

Thus, curved display 1 has a configuration of a crosswise field scheme in which an electric field substantially parallel to TFT substrate 100 and CF substrate 200 is applied to liquid crystal layer 300. For example, curved display 1 has a configuration of an IPS (In-Plane Switching) scheme. Curved display 1 is not limited to the crosswise field scheme. For example, curved display 1 may have a configuration of a VA (Vertical Alignment) scheme.

A method for driving curved display 1 will briefly be described below. A scanning gate voltage (gate-on voltage, gate-off voltage) is supplied from gate line driving circuit 30 to gate line 12. A video data voltage is supplied from data line driving circuit 20 to data line 11. When the gate-on voltage is supplied to gate line 12, thin film transistor 13 is put into an on state, and the data voltage supplied to data line 11 is transmitted to pixel electrode 15 through drain electrode 22 and source electrode 23. A common voltage (Vcom) is supplied from common electrode driving circuit (not illustrated) to common electrode 16. Common electrode 16 overlaps pixel electrode 15 with insulator 104 interposed therebetween, and an opening (slit) is formed in pixel electrode 15. Therefore, liquid crystal 301 is driven by an electric field from pixel electrode 15 to common electrode 16 through liquid crystal layer 300 and the opening of pixel electrode 15. Liquid crystal 301 is driven to control transmittance of light transmitted through liquid crystal layer 300, thereby displaying the image. The method for driving curved display 1 is not limited to the above method, but a known method can be adopted.

Curved display 1 has a configuration suppressing the display quality degradation, such as the display unevenness, which is caused by the displacement between TFT substrate 100 and CF substrate 200. Specifically, for example, the width of black matrix 203 is set to a different value according to the area where the displacement occurs. The specific configuration of black matrix 203 according to the present exemplary embodiment will be described below.

Figure 9:
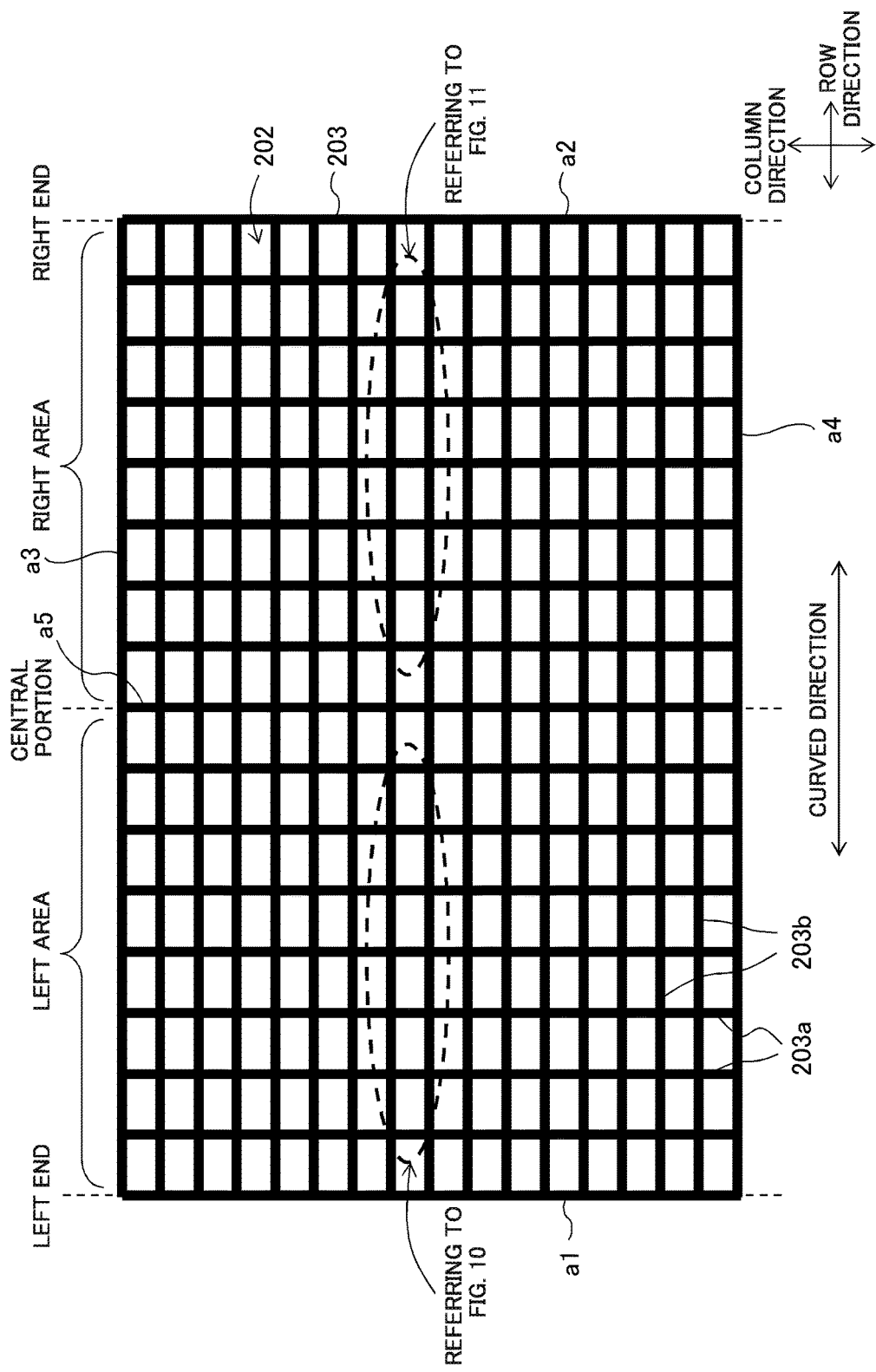
FIG. 9 is a plan view illustrating a schematic configuration of a black matrix according to an exemplary embodiment.

FIG. 9 is a plan view illustrating an entire configuration of black matrix 203. Black matrix 203 is formed into a lattice shape as a whole, and at least a part of black matrix 203 overlaps data line 11 and gate line 12 in a plan view. An area surrounded by black matrix 203 constitutes light transmission part 202. A case where the bending direction of curved display 1 is the row direction (see FIG. 4) is given as an example. In curved display 1, compared with portions located at both ends in the row direction (first direction), a portion located at the center in the row direction (first direction) is curved so as to be convex on the display surface side or the rear surface side. FIG. 9 illustrates a central portion which is a center portion in the row direction of the display area (display screen), a left end portion that constitutes a left end in the row direction when the display screen is visually recognized, a right end portion that constitutes a right end in the row direction when the display screen is visually recognized, a left area which is an area between the central portion and the left end portion, and a right area which is an area between the central portion and the right end portion in the whole area of black matrix 203.

As illustrated in FIG. 9, black matrix 203 which is the light shielding part includes a plurality of column portions 203a (second light shielding portions) extending in the column direction (second direction) and a plurality of row portions 203b (first light shielding portions) extending in the row direction (first direction). The plurality of column portions 203a include first end light shielding portion a1 and second end light shielding portion a2. First end light shielding portion a1 constituting the left end portion of black matrix 203 is disposed on one end side in the row direction. Second end light shielding portion a2 constituting the right end portion of black matrix 203 is disposed on the other end side in the row direction. The plurality of row portions 203b include third end light shielding portion a3 and fourth end light shielding portion a4. Third end light shielding portion a3 constituting one end portion in the column direction of black matrix 203 is disposed on one end side in the column direction. Fourth end light shielding portion a4 constituting the other end portion in the column direction of black matrix 203 is disposed on the other end side in the column direction of the display surface. The plurality of column portions 203a also include central light shielding portion a5 disposed on the central side in the row direction.

Figure 10:
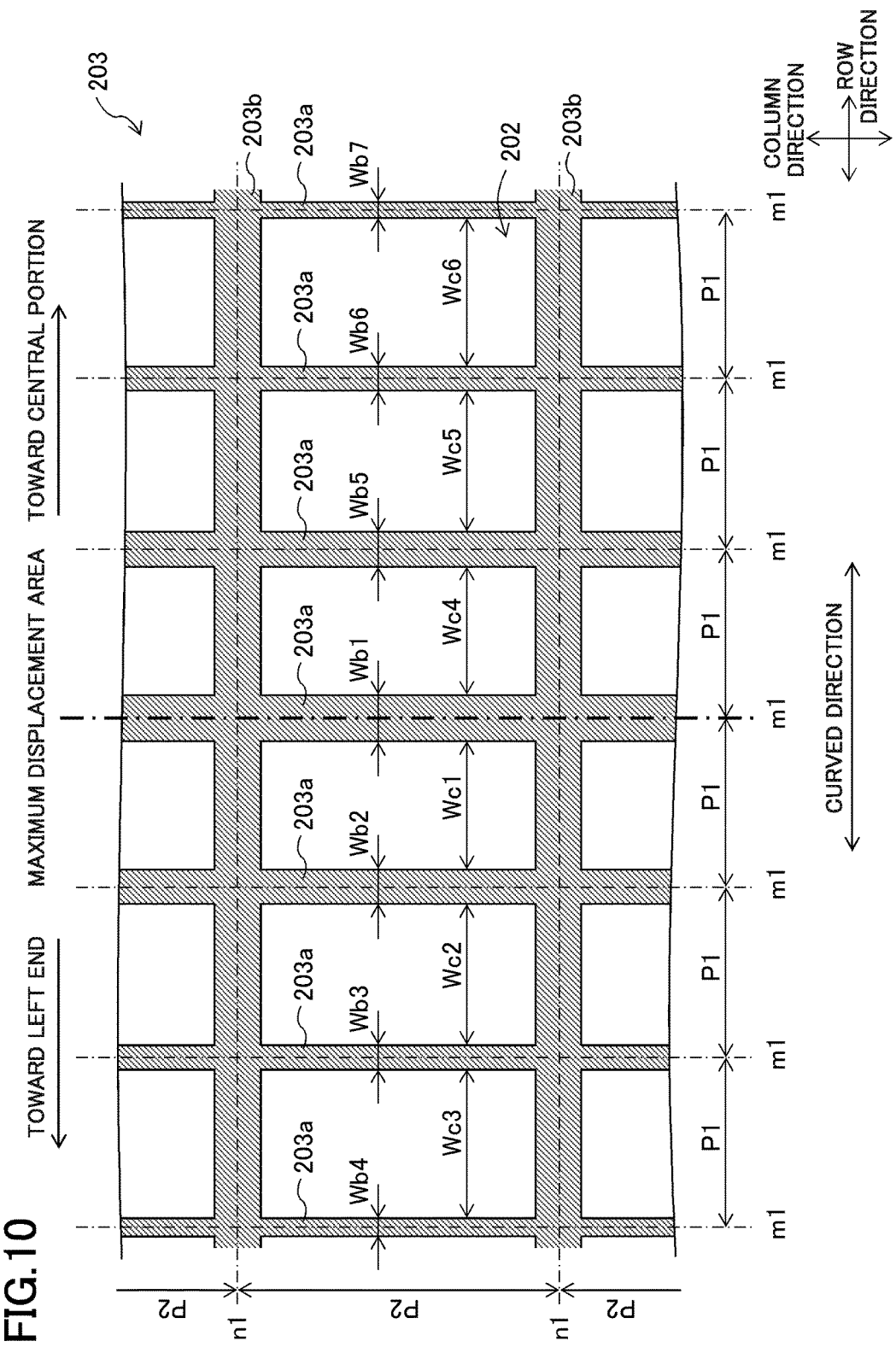
FIG. 10 is a partly expanded plan view illustrating a left area of the black matrix in FIG. 9.
Figure 11:
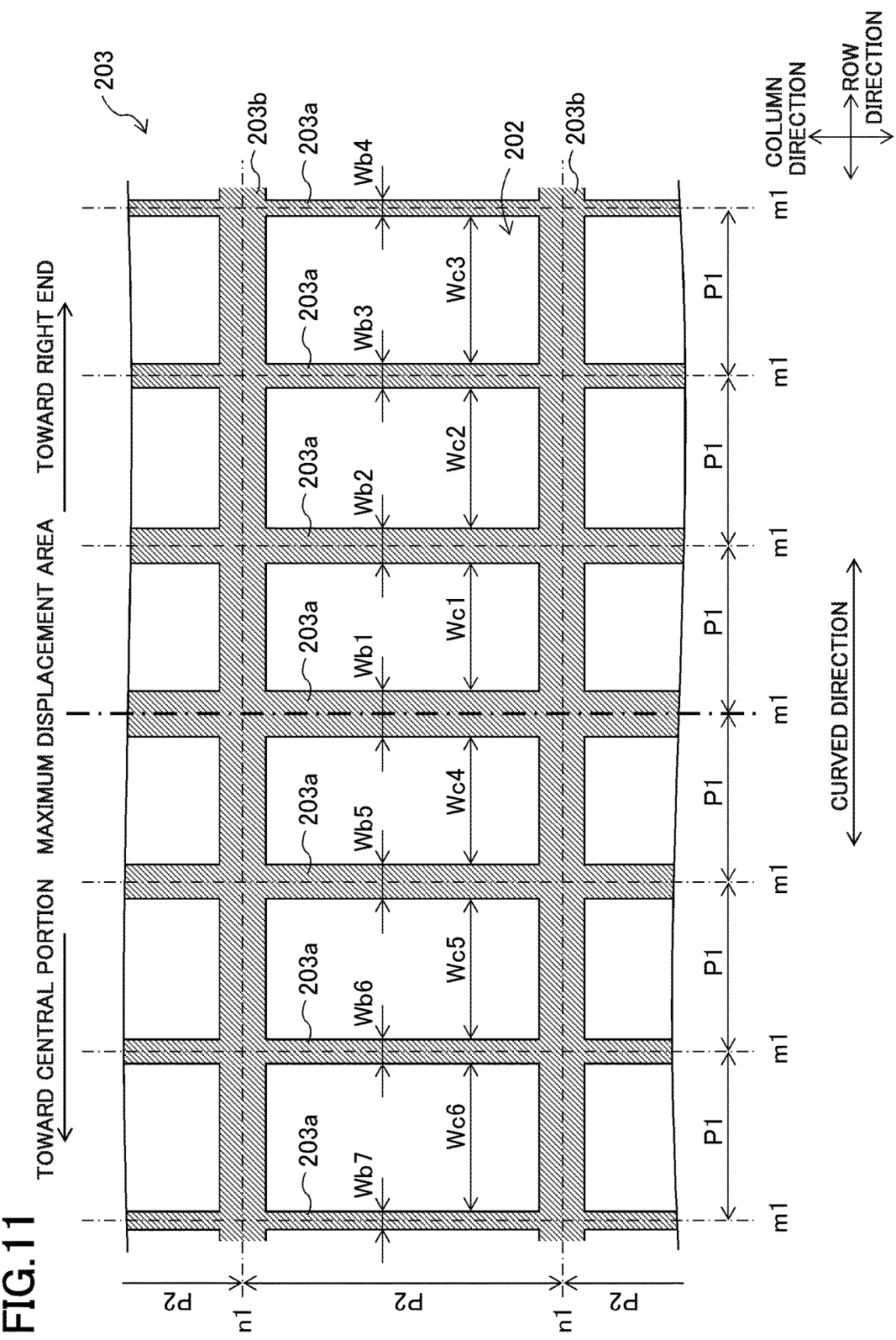
FIG. 11 is a partly expanded plan view illustrating a right area of the black matrix in FIG. 9.

FIG. 10 illustrates a configuration in which a part of the left area is enlarged in the entire configuration of black matrix 203 in FIG. 9. FIG. 11 illustrates a configuration in which a part of the right area is enlarged in the entire configuration of black matrix 203 in FIG. 9.

Figure 15:
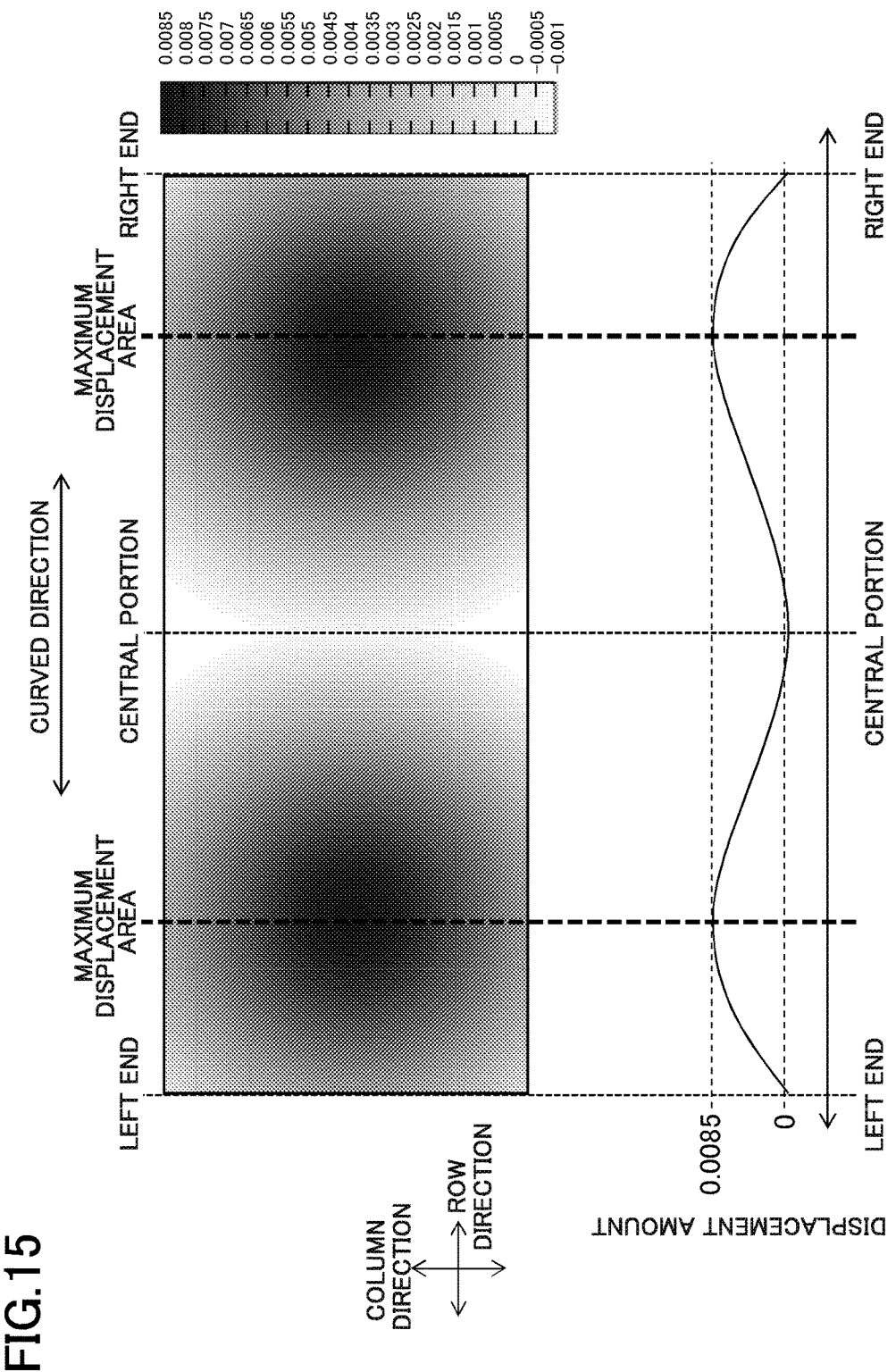
FIG. 15 is a view illustrating a simulation result of the displacement amount that occurs when the display panel in which the TFT substrate and the CF substrate are bonded to each other is bent.

In the left area of FIG. 10, black matrix 203 is set such that width Wb of column portion 203a extending in the column direction orthogonal to the bending direction varies according to the displacement amount, although width Wb of column portion 203a represents a length in the row direction. Specifically, black matrix 203 is set such that width Wb1 of column portion 203a closest to the area where the displacement amount is maximized (the maximum displacement area in FIG. 15) becomes largest, and width Wb of column portion 203a becomes narrower toward the left end portion and central portion from the maximum displacement area. That is, the width of column portion 203a of black matrix 203 is set so as to satisfy Wb1>Wb2>Wb3>Wb4 and Wb1>Wb5>Wb6>Wb7. Column portions 203a of black matrix 203 are disposed at equal intervals (pitch P1) in the row direction. The position of center line m1 of the width of column portion 203a coincides with the position of the center line of the width in the row direction of data line 11. Therefore, the width of light transmission part 202 (opening) becomes Wc1<Wc2<Wc3 and Wc4<Wc5<Wc6.

In black matrix 203, the widths of row portions 203b extending in the bending direction (in this case, the row direction) are set so as to be equal to one another. Row portions 203b of black matrix 203 are disposed at equal intervals (pitch P2) in the column direction. The position of center line n1 of the width in the column direction of row portion 203b coincides with the position of the center line of the width in the column direction of gate line 12.

The right area in FIG. 11 and the left area in FIG. 10 are symmetrical with respect to the central portion (see FIG. 9). That is, black matrix 203 is set such that width Wb of column portion 203a varies according to the displacement amount. Specifically, black matrix 203 is set such that width Wb1 of column portion 203a closest to the area where the displacement amount is maximized (the maximum displacement area in FIG. 15) becomes largest, and width Wb of column portion 203a becomes narrower toward the right end portion and central portion from the maximum displacement area. That is, the width of column portion 203a of black matrix 203 is set so as to satisfy Wb1>Wb2>Wb3>Wb4 and Wb1>Wb5>Wb6>Wb7. Column portions 203a of black matrix 203 are disposed at equal intervals (pitch P1) in the row direction. The position of center line m1 of the width of column portion 203a coincides with the position of the center line of the width of data line 11. Therefore, the width of light transmission part 202 (opening) becomes Wc1<Wc2<Wc3 and Wc4<Wc5<Wc6.

In black matrix 203, the configuration of row portion 203b extending in the bending direction (in this case, the row direction) is identical to that in FIG. 10.

Figure 12:
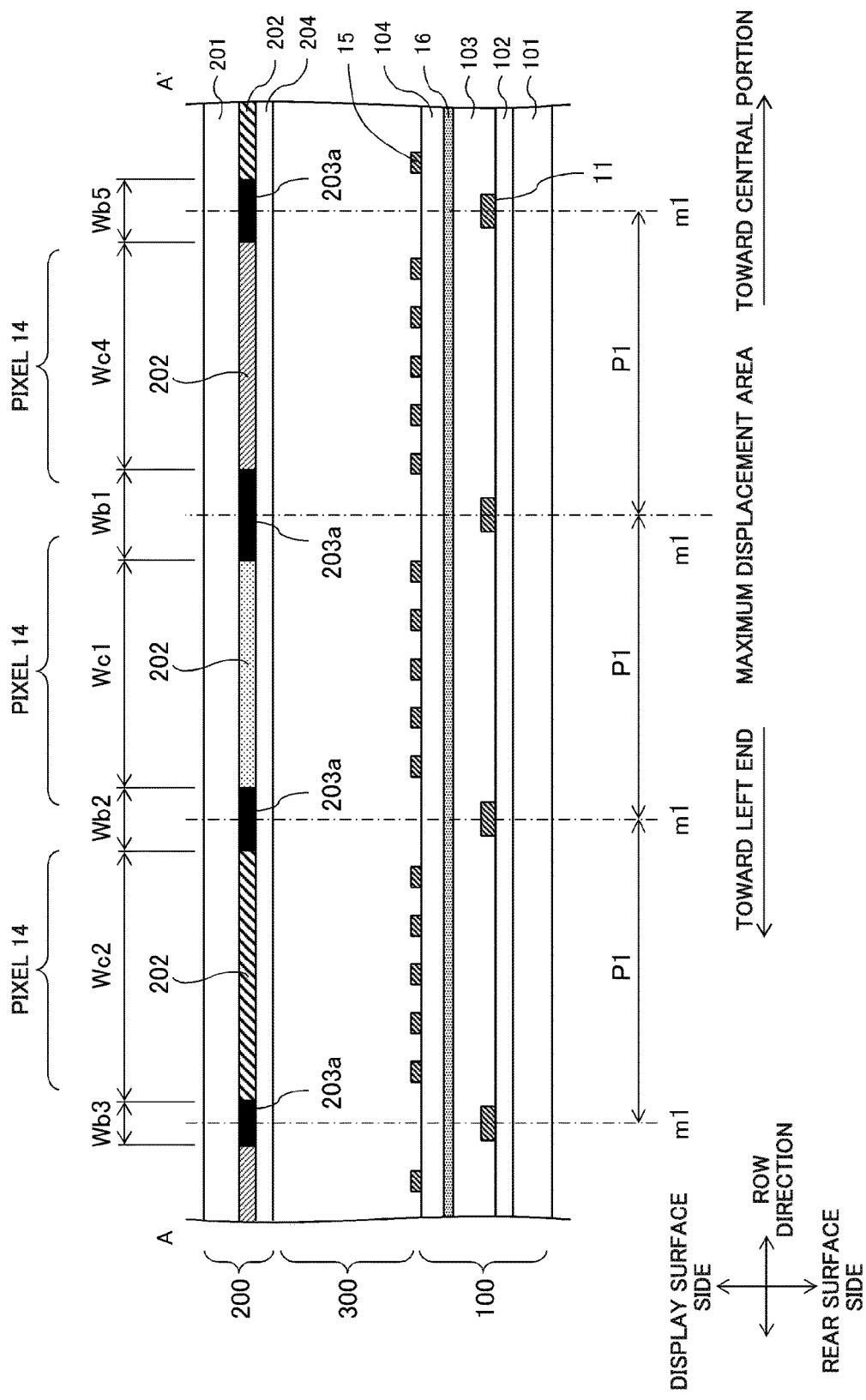
FIG. 12 is a view illustrating a sectional configuration of three pixels adjacent to one another in the row direction.

FIG. 12 is a view illustrating a sectional configuration of three pixels 14 adjacent to one another in the row direction. FIG. 12 illustrates a part of black matrix 203 in FIG. 10. As illustrated in FIG. 12, column portion 203a closest to the area where the displacement amount is maximized (the maximum displacement area in FIG. 15) has the maximum width Wb1, and width Wb of column portion 203a becomes narrower toward the left end portion and central portion. Column portion 203a overlaps data line 11 in a plan view.

In the above configuration, black matrix 203 has the width according to the displacement amount, so that the light leakage caused by the displacement between TFT substrate 100 and CF substrate 200 can be suppressed while a numerical aperture is not degraded more than necessary.

Figure 13:
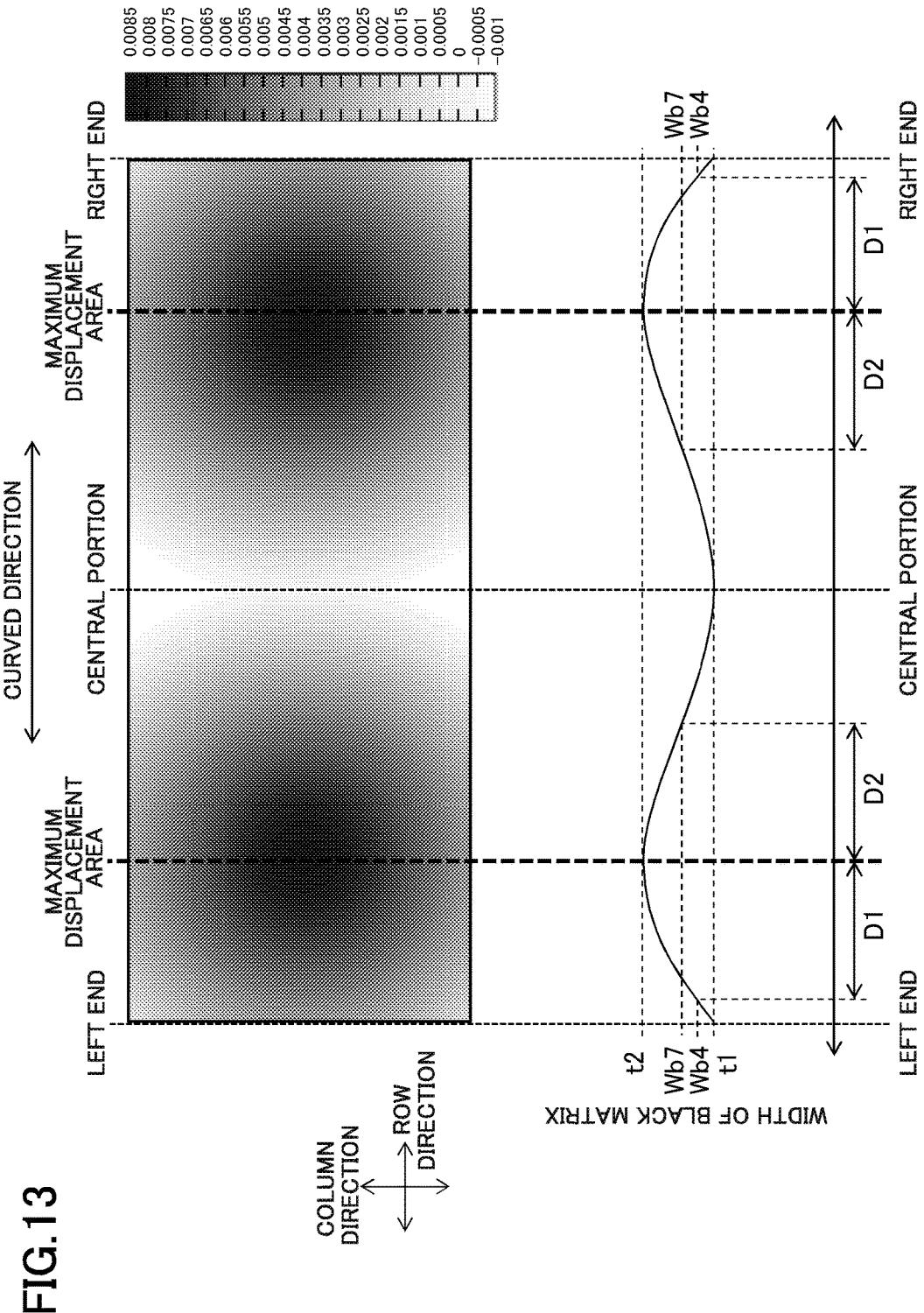
FIG. 13 is a graph illustrating a relationship between the width of black matrix and the displacement amount.

FIG. 13 is a graph illustrating a relationship between the width of black matrix 203 and the displacement amount. FIG. 13 illustrates width Wb of column portion 203a of black matrix 203 in the case where the bending direction is the row direction. For example, widths Wb of the column portions 203a is t1 and equal to one another in the central portion, right end portion, and left end portion, where the displacement hardly occurs and the displacement amount is minimized. On the other hand, widths Wb of the column portions 203a is t2 (t2>t1) in the area (the right and left maximum displacement areas) where the displacement easily occurs and the displacement amount is maximized. In the right and left areas, a ratio of a change in the displacement amount from the maximum displacement area to the end portion (the right end portion or the left end portion) is larger than a ratio of a change in the displacement amount from the maximum displacement area to the central portion. For this reason, preferably the width of column portion 203a of black matrix 203 is set according to the ratio. For example, in FIG. 10, width Wb2 of column portion 203a disposed on the left side of column portion 203a having width Wb1 is narrower than width Wb5 of column portion 203a disposed on the right side of column portion 203a having width Wb1 (Wb2<Wb5), and width Wb3 of column portion 203a disposed on the left side of column portion 203a having width Wb1 is narrower than width Wb6 of column portion 203a disposed on the right side of column portion 203a having width Wb1 (Wb3<Wb6). Similarly, the width of column portion 203a is set so as to be Wb4<Wb7. FIG. 13 illustrates width Wb4, Wb7 of column portion 203a by way of example. At this point, it is assumed that distance D1 from the center of the maximum displacement area to the center of width Wb4 is equal to distance D2 from the center of the maximum displacement area to the center of width Wb7. Thus, when the widths of the right and left column portions 203a having the same distance from the center of the maximum displacement area are compared to each other, the width of column portion 203a on the end side is narrower than the width of column portion 203a on the central side.

Figure 14:
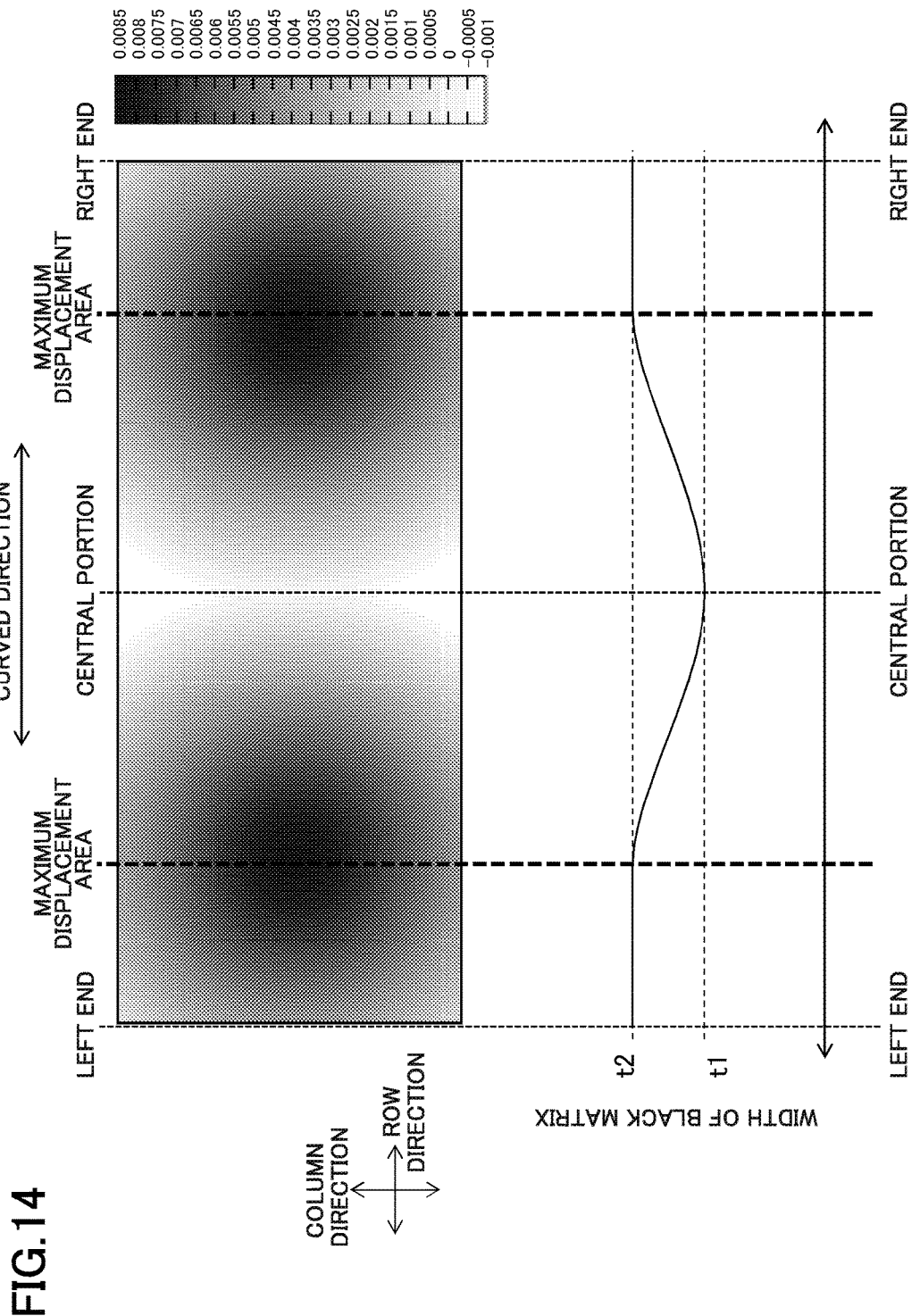
FIG. 14 is a graph illustrating the other relationship between the width of black matrix and the displacement amount.

FIG. 14 is a graph illustrating another relationship between the width of black matrix 203 and the displacement amount. FIG. 14 illustrates width Wb of column portion 203a of black matrix 203 in the case where the bending direction is the row direction, similarly to FIG. 13. As illustrated in FIG. 14, width Wb of column portion 203a is t1 in the central portion, and width Wb of column portion 203a is t2 in the right and left maximum displacement areas (t2>t1). In the right and left areas, width Wb of column portion 203a is kept constant from the maximum displacement area to the end portion (the right end portion or the left end portion). In the example of FIG. 14, the display quality degradation caused by a luminance difference between the right and left maximum displacement areas and the right or left end portion can be suppressed because the luminance in the end portion is prevented from increasing more than necessary. Thus, width Wb of column portion 203a in the maximum displacement area is wider than width Wb of column portion 203a in the central portion, and is equal to width Wb of column portion 203a in the end portion (the right end portion or the left end portion).

The above example illustrates the case where the bending direction is the row direction. In the case where the bending direction is the column direction, similarly, the width of row portion 203b of black matrix 203 may be set so as to vary according to the displacement amount (see FIG. 15). Regardless of the bending direction, both the width of column portion 203a and the width of row portion 203b of black matrix 203 may be set so as to vary according to the displacement amount (see FIG. 15).

In the above example, the position of center line m1 of the width in the row direction of column portion 203a of black matrix 203 coincides with the position of the center line of the width in the row direction of data line 11. Alternatively, the center position of center line m1 of the width in the row direction of column portion 203a of black matrix 203 may be displaced from the center position of the center line of the width in the row direction of data line 11. For example, in curved display 1 of FIG. 3, the width of column portion 203a of black matrix 203 disposed on the left area is set such that the position of center line m1 of the width in the row direction of column portion 203a is displaced to the central portion side with respect to the position of the center line of the width in the row direction of data line 11, and the width of column portion 203a of black matrix 203 disposed on the right area is set such that the position of center line m1 of the width in the row direction of column portion 203a is displaced to the central portion side with respect to the position of the center line of the width in the row direction of data line 11. A relationship between the position of center line m1 of the width in the row direction of column portion 203a of black matrix 203 and the position of the center line of the width in the row direction of data line 11 may be set in consideration of a visual recognition direction or a size of the display panel.

Curved display 1 of the present disclosure can be used in various electronic devices such as a medical device and an automotive device in addition to a television set and a smartphone. A case where the curved display 1 of the present disclosure is used as the automotive device will be described in detail below.

Figure 16:
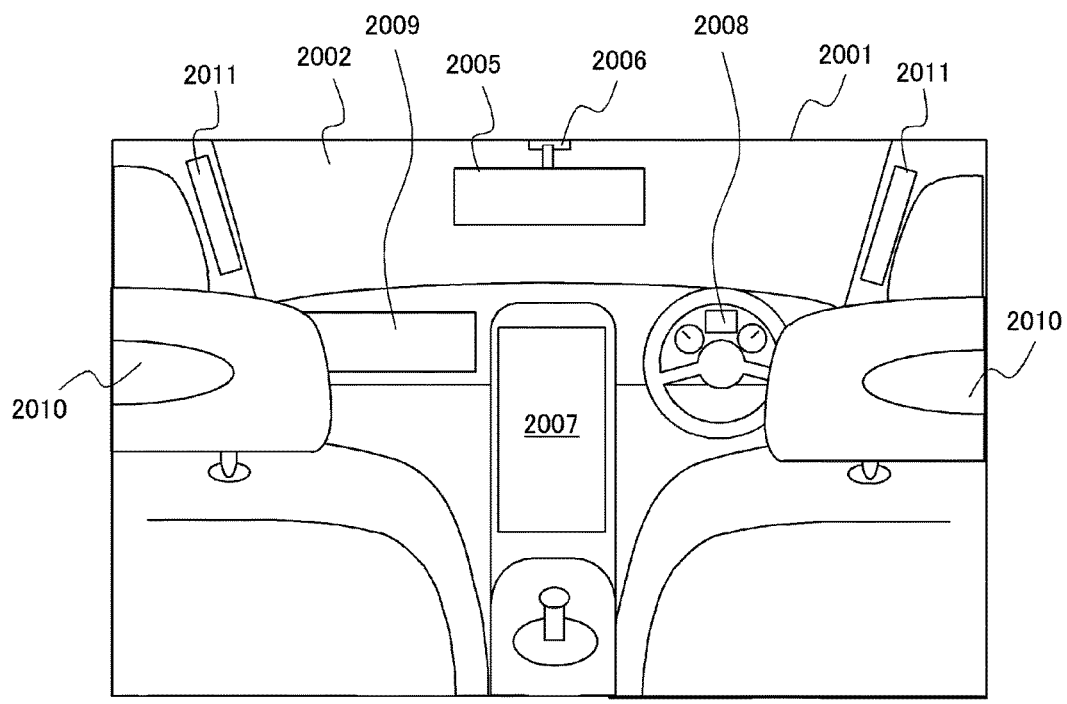
FIG. 16 is a schematic diagram illustrating an example in which the automotive device equipped with curved display is mounted on vehicle.

FIG. 16 is a schematic diagram illustrating an example in which the automotive device equipped with curved display 1 is mounted on vehicle 2001. As illustrated in FIG. 16, the automotive device of the present disclosure can be used as electronic mirror device 2005, center information display (hereinafter, abbreviated as CID) 2007, and cluster portion 2008, in which exterior or interior information on vehicle 2001 can be projected. These automotive devices effectively assist safe driving of a driver. Electronic mirror device 2005 is incorporated in vehicle compartment 2002 through attaching portion 2006. The automotive device of the present disclosure can also be used as front passenger seat display 2009 and rear passenger seat display 2010. A person other than the driver effectively assists the safe driving of the driver using these automotive devices. The automotive device of the present disclosure can also be used as wide-view angle ensuring display 2011 that is disposed in a pillar located between a front glass and a side glass. A blind angle of the driver may occur at the pillar. The safe driving of the driver can be assisted if the exterior information corresponding to the blind angle is projected to the pillar. Therefore, wide-view angle ensuring display 2011 is preferably disposed in the pillar in order to project the exterior information on the vehicle. There is no particular limitation to the use of automotive device 500 as long as automotive device 500 is mounted on vehicle 2001 to display the video.

Figure 17:
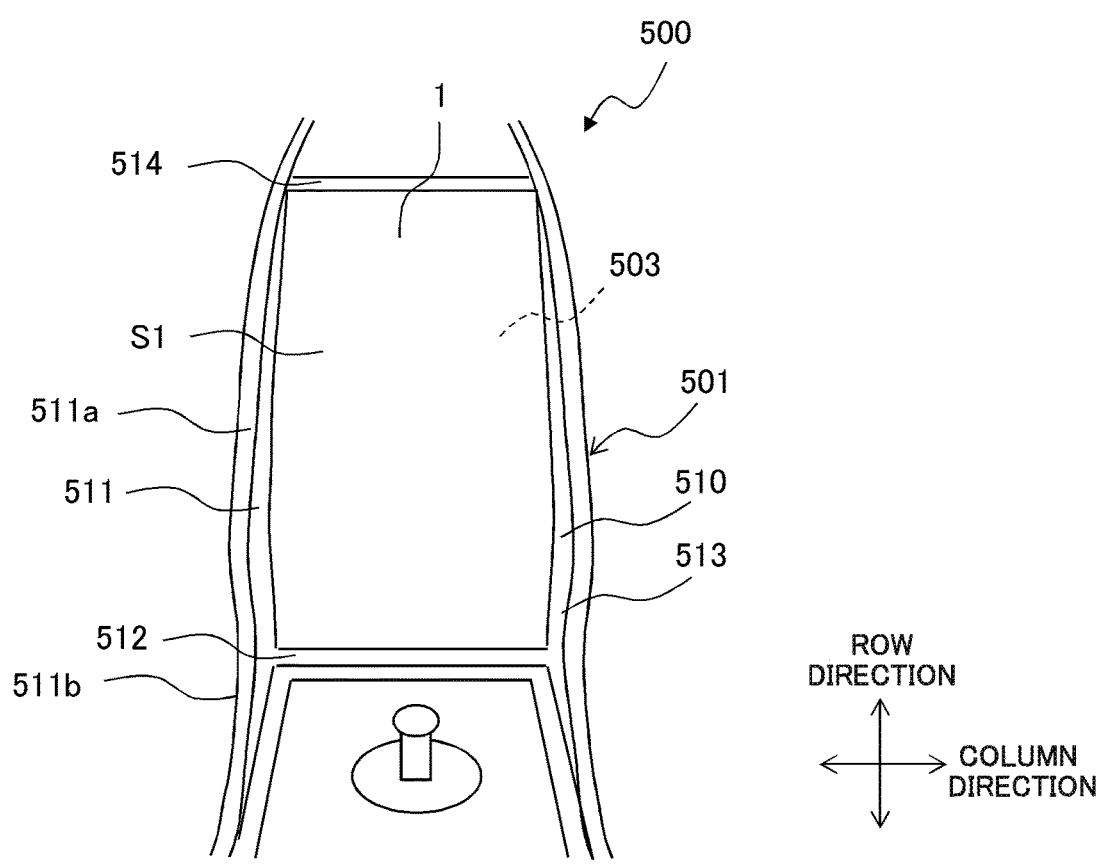
FIG. 17 illustrates an example in which automotive device is used as CID.

FIG. 17 illustrates an example in which automotive device 500 is used as CID 2007. At this point, FIG. 17 is a front view of automotive device 500. As illustrated in FIG. 17, automotive device 500 includes main body component 501 and curved display 1 held by main body component 501. Main body component 501 is a component used to attach curved display 1 to vehicle 2001, and is also called a housing or a chassis. Main body component 501 includes frame body 510 disposed in a periphery of curved display 1, and display surface S1 that displays the video of curved display 1 is exposed from opening 503 surrounded by frame body 510.

As illustrated in FIG. 17, frame body 510 of main body component 501 includes first frame edge portion 511 and third frame edge portion 513, which are disposed opposite to each other in the column direction (second direction), and second frame edge portion 512 and fourth frame edge portion 514, which are disposed opposite to each other in the row direction (the bending direction or the first direction). First frame edge portion 511 and third frame edge portion 513 correspond to a place extending in the row direction (first direction), that is, the row direction (first direction), and second frame edge portion 512 and fourth frame edge portion 514 correspond to a place extending in the column direction (second direction), that is, the row direction (first direction). As can be seen from FIG. 19 described later, first frame edge portion 511 corresponds to third end light shielding portion a3 in the periphery of curved display 1, more particularly is located along third end light shielding portion a3, second frame edge portion 512 corresponds to first end light shielding portion a1 in the periphery of curved display 1, more particularly is located along first end light shielding portion a1, third frame edge portion 513 corresponds to fourth end light shielding portion a4 in the periphery of curved display 1, more particularly is located along fourth end light shielding portion a4, and fourth frame edge portion 514 corresponds to second end light shielding portion a2 in the periphery of curved display 1, more particularly is located along second end light shielding portion a2.

Figure 18:
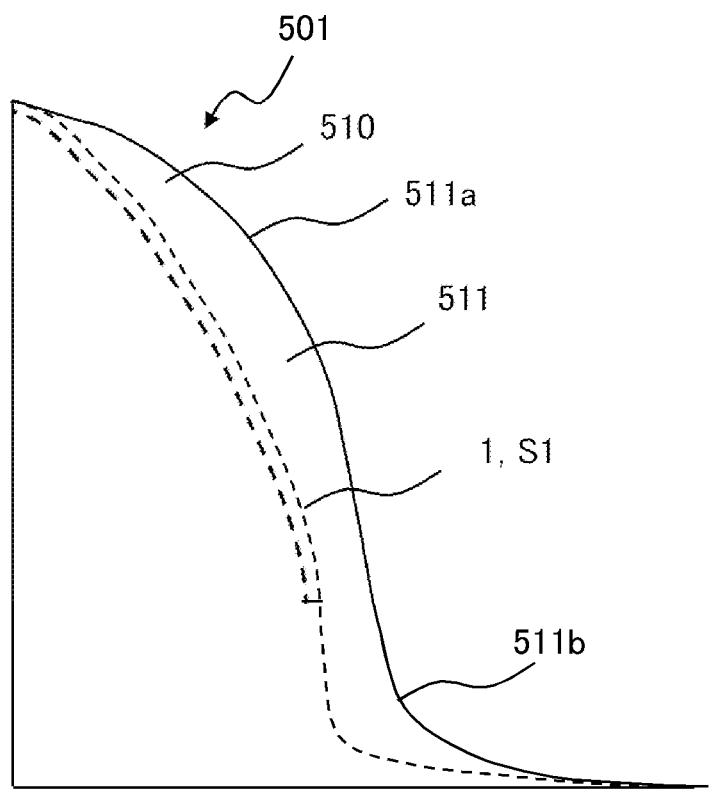
FIG. 18 is a side view of automotive device in FIG. 17.

FIG. 18 is a side view of automotive device 500. As illustrated in FIG. 18, first frame edge portion 511 includes first bent area 511a that is curved in the row direction (first direction) so as to project toward a direction identical to curved display 1. In the example of FIG. 18, curved display 1 is curved such that the portion located at the center in the row direction becomes convex from the rear surface side toward the display surface side. Therefore, first bent area 511a is also curved such that the portion located at the center in the row direction becomes convex from the rear surface side toward the display surface side. Accordingly, a risk that a foreign material or dirt entering from a boundary between curved display 1 and frame body 510 can be reduced because at least a part of frame body 510 disposed in the periphery of curved display 1 is curved along curved display 1.

As can be seen from FIGS. 9 and 18, in the row direction (first direction), first bent area 511a is located in an area between first end light shielding portion a1 and second end light shielding portion a2.

First frame edge portion 511 includes second bent area 511b that is disposed closer to first end light shielding portion a1 than first bent area 511a. Second bent area 511b is curved in the row direction (first direction) so as to project toward a direction opposite to first bent area 511a. That is, second bent area 511b is curved such that a portion located at the center in the row direction becomes convex from the display surface side toward the rear surface side.

Figure 19:
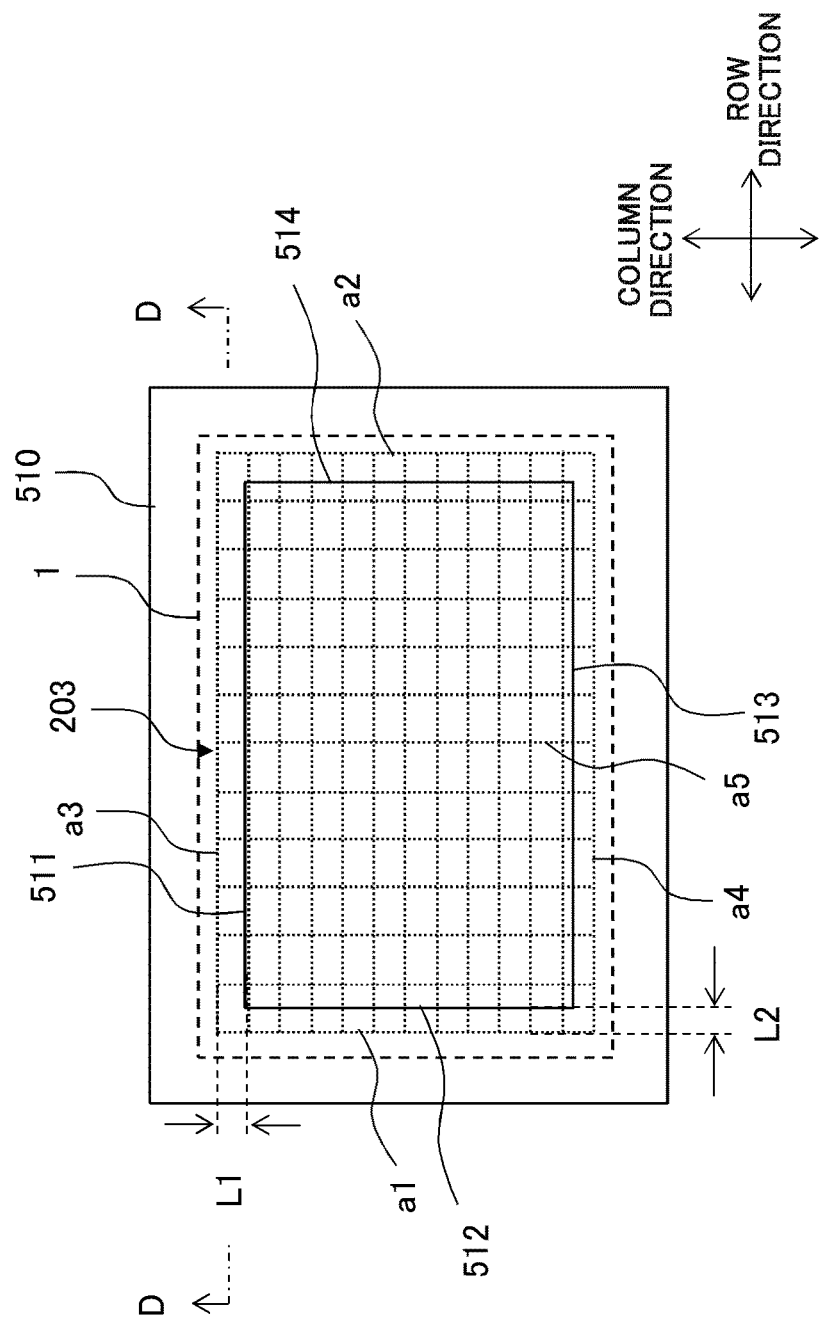
FIG. 19 is a plan view illustrating a black matrix and a frame body in the curved display.
Figure 20:
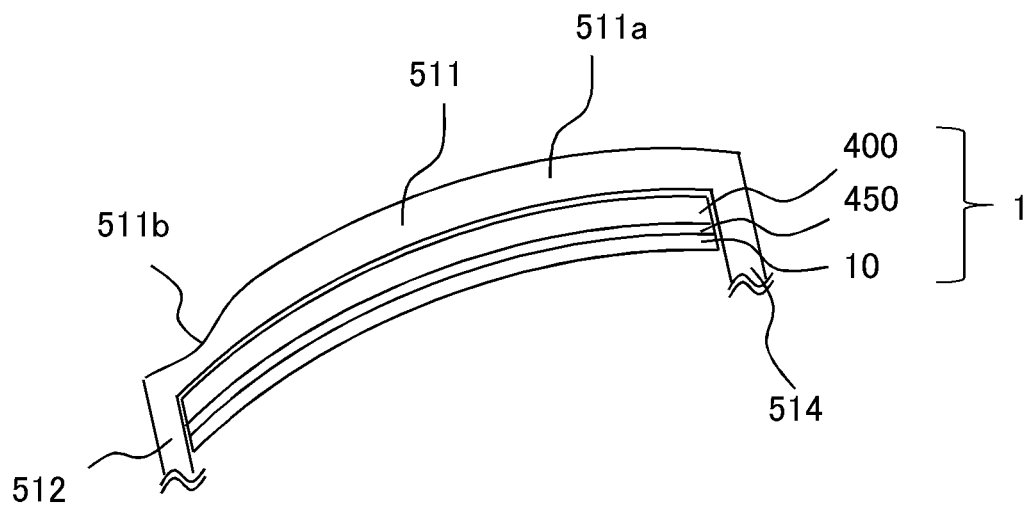
FIG. 20 is a sectional view taken along line D-D in FIG. 19.

FIG. 19 is a plan view illustrating black matrix 203 and frame body 510 in curved display 1. FIG. 20 is a sectional view taken along line D-D in FIG. 19. As illustrated in FIGS.

19 and 20, each of first frame edge portion 511, second frame edge portion 512, third frame edge portion 513, and fourth frame edge portion 514 partially covers a peripheral area of curved display 1 in a plan view. In particular, first frame edge portion 511 overlaps third end light shielding portion a3 in a plan view, second frame edge portion 512 overlaps first end light shielding portion a1 in a plan view, third frame edge portion 513 overlaps fourth end light shielding portion a4 in a plan view, and fourth frame edge portion 514 overlaps second end light shielding portion a2 in a plan view. Frame edge portions 511 to 514 are formed up to the positions that overlap corresponding end light shielding portions a1 to a4 in a plan view, which allows the light leakage occurring from four corners of curved display 1 to become inconspicuous.

In the example of FIG. 19, first frame edge portion 511 protrudes onto the central side of curved display 1 beyond third end light shielding portion a3 in a plan view, and second frame edge portion 512 protrudes onto the central side of curved display 1 beyond first end light shielding portion a1 in a plan view. Length L1 in which first frame edge portion 511 protrudes from third end light shielding portion a3 in a plan view is longer than length L2 in which second frame edge portion 512 protrudes from first end light shielding portion a1 in a plan view.

FIG. 20 illustrates a layer configuration of curved display 1. As illustrated in FIG. 20, curved display 1 includes front plate 400 formed into a curved shape, and display panel 10 is bonded to front plate 400 with bonding agent 450 interposed therebetween. In the configuration, display panel 10 can be held in front plate 400 in a curved state.

Figure 21:
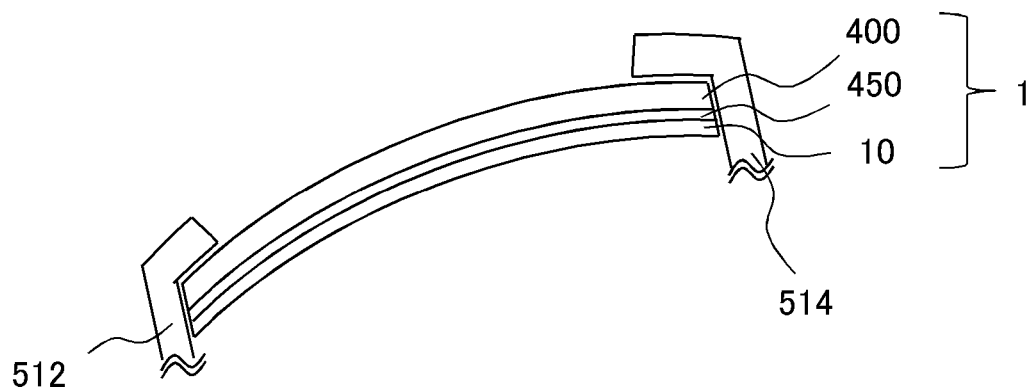
FIG. 21 illustrates a modification of the layer configuration in FIG. 20.

FIG. 21 illustrates a modification of the layer configuration in FIG. 20, and illustrates a case where first frame edge portion 511 is not provided in frame body 510. In the example of FIG. 21, frame body 510 of main body component 501 includes second frame edge portion 512 located along first end light shielding portion a1 in the periphery of curved display 1 and fourth frame edge portion 514 located along second end light shielding portion a2 in the periphery of curved display 1, second frame edge portion 512 overlaps first end light shielding portion a1 in a plan view, and fourth frame edge portion 514 overlaps second end light shielding portion a2 in a plan view.

Figure 22:
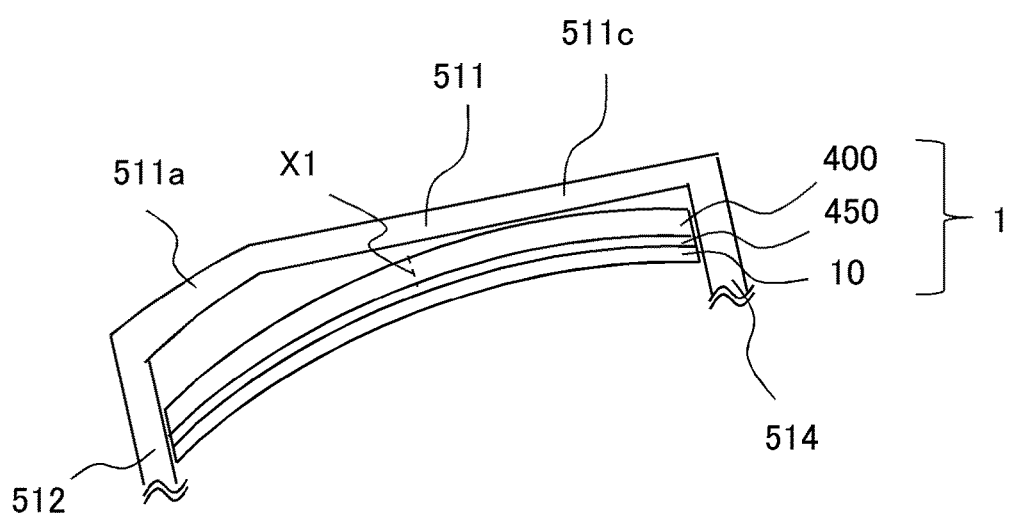
FIG. 22 illustrates a modification of the arrangement of first bent area in a section corresponding to FIG. 20.

FIG. 22 illustrates a modification of the arrangement of first bent area 511a in a section corresponding to FIG. 20. In the example of FIG. 22, first frame edge portion 511 includes first bent area 511a, and flat area 511c that is disposed in an area away from first end light shielding portion a1 (see FIG. 19) than first bent area 511a. First bent area 511a is located closer to first end light shielding portion a1 than to central light shielding portion a5 (see FIG. 19) in the plurality of column portions 203a. More particularly, first bent area 511a is located away from first end light shielding portion a1 by a distance smaller than a half of a distance from first end light shielding portion a1 to central light shielding portion a5. In the example of FIG. 22, like the example in FIG. 18, first frame edge portion 511 may further include second bent area 511b, and second bent area 511b may be disposed at a position away from a display side than first bent area 511a.

In the above, the specific embodiments of the present application have been described, but the present application is not limited to the above-mentioned embodiments, and various modifications may be made as appropriate without departing from the spirit of the present application.

What is claimed is:

1. A curved display comprising:
   a first substrate in which a portion located at a center in a first direction is convexly or concavely curved toward a display surface side with respect to portions located at both ends in the first direction; and
   a second substrate that is disposed opposite to the first substrate and curved along the first substrate,
   wherein the first substrate includes a plurality of data lines and a plurality of gate lines,
   the second substrate includes a plurality of light transmission parts that transmits light and a light shielding part that is formed around each of the plurality of light transmission parts to block the light transmission,
   the light shielding part includes a plurality of first light shielding portions extending in the first direction and a plurality of second light shielding portions extending in a second direction different from the first direction,
   the plurality of second light shielding portions include a first end light shielding portion disposed on one end side in the first direction of the display surface, a central light shielding portion disposed closer to a central side of the display surface than the first end light shielding portion, and at least three consecutive middle light shielding portions disposed between the central light shielding portion and the first end light shielding portion, and
   a width of each of the middle light shielding portions is wider than a width of the central light shielding portion and is wider than or equal to a width of the first end light shielding portion, wherein the widths represent a length in the first direction.

2. The curved display according to claim 1, wherein
   the middle light shielding portions include a widest middle light shielding portion,
   a first plurality of the middle light shielding portions is disposed between the widest middle light shielding portion and the central side of the display surface, the width of each of the middle light shielding portions of the first plurality becoming more narrow as said middle little shielding portion is closer to the central side of the display surface, and
   a second plurality of the middle light shielding portions is disposed between the widest middle light shielding portion and the end side of the display surface, the width of each of the middle light shielding portions of the second plurality becoming more narrow as said middle little shielding portion is closer to the end side of the display surface.

3. The curved display according to claim 2, wherein with respect to a width of each of the plurality of second light shielding portions which represents a length in the first direction, a ratio of a change in the width from the middle light shielding portion having a maximum width to the end light shielding portion is larger than a ratio of a change in the width from the middle light shielding portion having the maximum width to the central light shielding portion.

4. A curved display comprising:
   a first substrate in which a portion located at a center in a first direction is convexly or concavely curved toward a display surface side with respect to portions located at both ends in the first direction; and
   a second substrate that is disposed opposite to the first substrate and curved along the first substrate,
   wherein the first substrate includes a plurality of data lines and a plurality of gate lines, the second substrate includes a plurality of light transmission parts that transmits light and a light shielding part that is formed around each of the plurality of light transmission parts to block the light transmission,
the light shielding part includes a plurality of first light shielding portions extending in the first direction and a plurality of second light shielding portions extending in a second direction different from the first direction,
the plurality of second light shielding portions include a central light shielding portion disposed on a central side of a display surface, a first end light shielding portion disposed on one end side in the first direction of the display surface, and a middle light shielding portion disposed between the central light shielding portion and the first end light shielding portion,
a width of the middle light shielding portion is wider than a width of the central light shielding portion and is wider than or equal to a width of the first end light shielding portion, wherein the widths represent a length in the first direction, and
the width of the central light shielding portion is equal to the width of the end light shielding portion.

5. A curved display comprising:
a first substrate in which a portion located at a center in a first direction is convexly or concavely curved toward a display surface side with respect to portions located at both ends in the first direction; and
a second substrate that is disposed opposite to the first substrate and curved along the first substrate,
wherein the first substrate includes a plurality of data lines and a plurality of gate lines,
the second substrate includes a plurality of light transmission parts that transmits light and a light shielding part that is formed around each of the plurality of light transmission parts to block the light transmission,
the light shielding part includes a plurality of first light shielding portions extending in the first direction and a plurality of second light shielding portions extending in a second direction different from the first direction,
the plurality of second light shielding portions include a central light shielding portion disposed on a central side of a display surface, a first end light shielding portion disposed on one end side in the first direction of the display surface, and a middle light shielding portion disposed between the central light shielding portion and the first end light shielding portion,
a width of the middle light shielding portion is wider than a width of the central light shielding portion and is wider than or equal to a width of the first end light shielding portion, wherein the widths represent a length in the first direction, and
a dimension of each of the plurality of first light shielding portions, which represents a length in the second direction, are equal to one another.

6. The curved display according to claim 1, wherein
the plurality of gate lines extend in the first direction, and
the plurality of data lines extend in the second direction, and
a center position of the width in the first direction of each of the plurality of second light shielding portions coincides with a center position of the width in the first direction of each of the plurality of data lines.

7. An automotive device comprising:
a curved display comprising:
a first substrate in which a portion located at a center in a first direction is convexly or concavely curved toward a display surface side with respect to portions located at both ends in the first direction, and
a second substrate that is disposed opposite to the first substrate and curved along the first substrate; and
a main body component including a frame body disposed in a periphery of the curved display, the main body component being used to attach the curved display to a vehicle,
wherein the frame body of the main body component includes a first frame edge portion extending in the first direction in the periphery of the curved display,
the first frame edge portion includes a first bent area that is curved so as to project toward a direction identical to the first substrate of the curved display,
the first substrate includes a plurality of data lines and a plurality of gate lines,
the second substrate includes a plurality of light transmission parts that transmits light and a light shielding part that is formed around each of the plurality of light transmission parts to block the light transmission,
the light shielding part includes a plurality of first light shielding portions extending in the first direction and a plurality of second light shielding portions extending in a second direction different from the first direction,
the plurality of second light shielding portions include a central light shielding portion disposed on a central side of a display surface, a first end light shielding portion disposed on one end side in the first direction of the display surface, and a middle light shielding portion disposed between the central light shielding portion and the first end light shielding portion, and
a width of the middle light shielding portion is wider than a width of the central light shielding portion and is wider than or equal to a width of the first end light shielding portion, wherein the widths represent a length in the first direction.

8. The automotive device according to claim 7, wherein
the plurality of second light shielding portions further include a second end light shielding portion disposed on another end side in the first direction of the display surface, and
the first bent area is located in an area between the first end light shielding portion and the second end light shielding portion in the first direction.

9. The automotive device according to claim 7, wherein at least a part of the first frame edge portion overlaps a third end light shielding portion in a plan view, the third end light shielding portion being disposed on one end side in the second direction in the plurality of first light shielding portions.

10. The automotive device according to claim 7, wherein
the frame body of the main body component includes a second frame edge portion that is located in the periphery of the curved display and corresponding to the first end light shielding portion, and
at least a part of the second frame edge portion overlaps the first end light shielding portion in a plan view.

11. The automotive device according to claim 10, wherein
the first frame edge portion protrudes onto the central side of the curved display beyond the third end light shielding portion in a plan view, the third end light shielding portion being disposed on one end side in the second direction in the plurality of first light shielding portions,
the second frame edge portion protrudes onto the central side of the curved display beyond the first end light shielding portion in a plan view, and a length in which the first frame edge portion protrudes from the third end light shielding portion in a plan view is longer than a length in which the second frame edge portion protrudes from the first end light shielding portion in a plan view.

12. The automotive device according to claim 7, wherein the first bent area is located closer to the first end light shielding portion than to the central light shielding portion.

13. The automotive device according to claim 7, wherein the first bent area is located away from the first end light shielding portion by a distance smaller than a half of a distance from the first end light shielding portion to a center of the central light shielding portion.

14. The automotive device according to claim 7, wherein
the first frame edge portion includes a second bent area disposed closer to the first end light shielding portion than the first bent area, and
the second bent area is curved in the first direction so as to project toward a direction opposite to the first bent area.

15. The automotive device according to claim 7, wherein the width of the central light shielding portion is equal to the width of the end light shielding portion.

16. The automotive device according to claim 7, wherein a dimension of each of the plurality of first light shielding portions, which represents a length in the second direction, are equal to one another.

17. The curved display according to claim 2, wherein
the first plurality of the middle light shielding portions includes one of the at least three consecutive middle light shielding portions, said one of the at least three consecutive middle light shielding portions being adjacent to the widest middle light shielding portion, and
the second plurality of the middle light shielding portions includes one of the at least three consecutive middle light shielding portions, said one of the at least three consecutive middle light shielding portions being adjacent to the widest middle light shielding portion.

* * * * *